April 8, 1952 HENRI-GEORGES DOLL 2,592,125
METHOD AND APPARATUS FOR LOGGING STATIC
SPONTANEOUS POTENTIALS IN WELLS
Filed Nov. 18, 1949 4 Sheets-Sheet 1

INVENTOR.
HENRI-GEORGES DOLL
BY
HIS ATTORNEYS.

April 8, 1952  HENRI-GEORGES DOLL  2,592,125
METHOD AND APPARATUS FOR LOGGING STATIC
SPONTANEOUS POTENTIALS IN WELLS
Filed Nov. 18, 1949  4 Sheets-Sheet 2
FIG.2B.
FIG.2A.
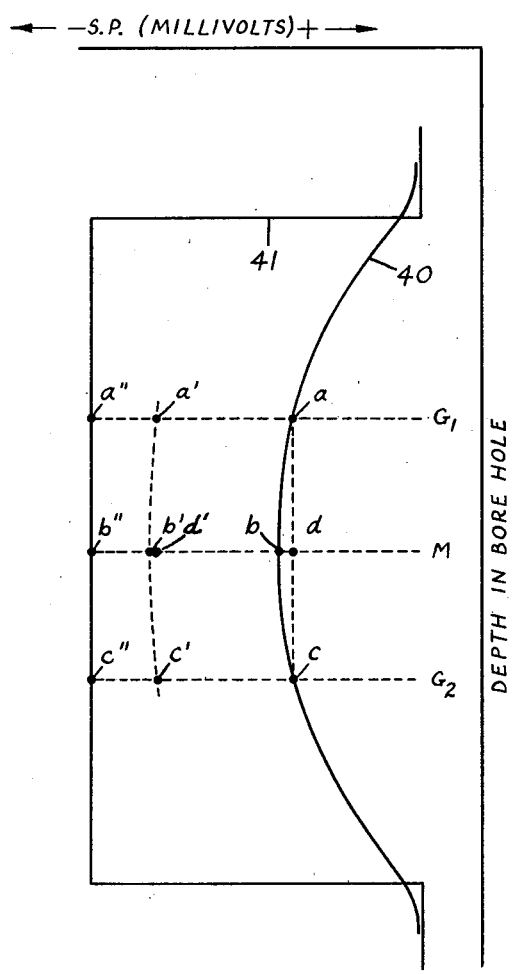
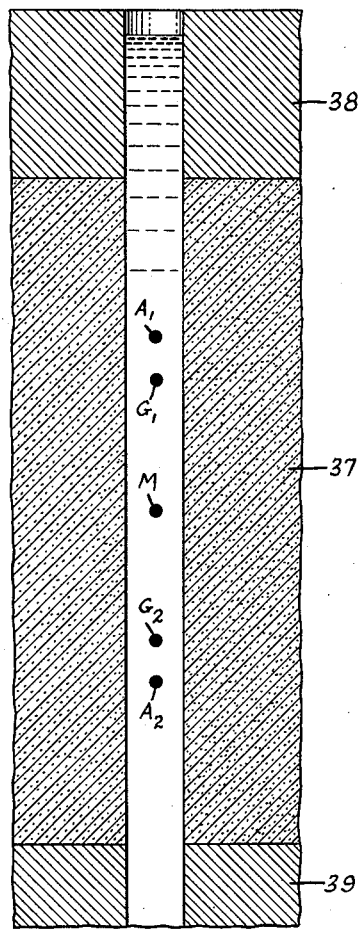
INVENTOR.
HENRI-GEORGES DOLL
HIS ATTORNEYS.

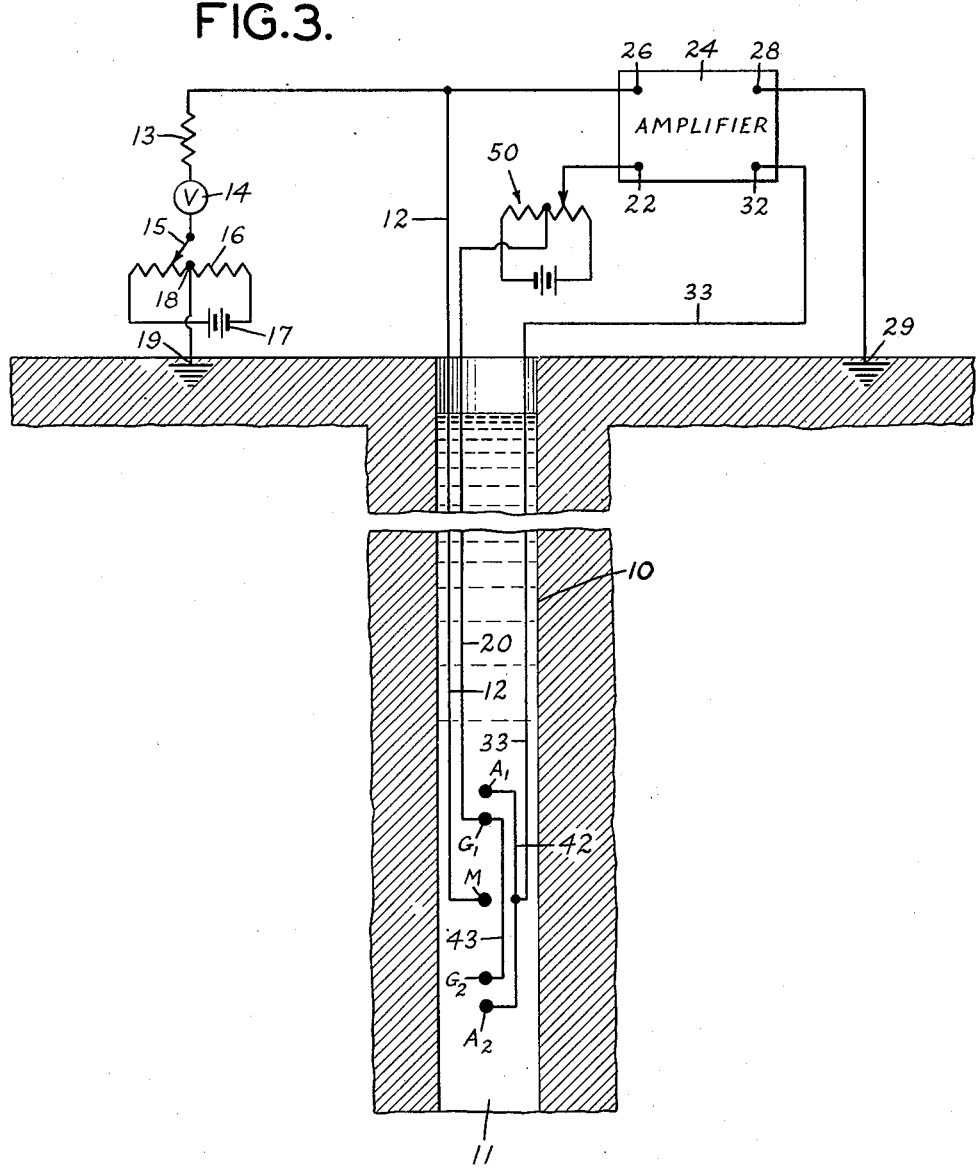

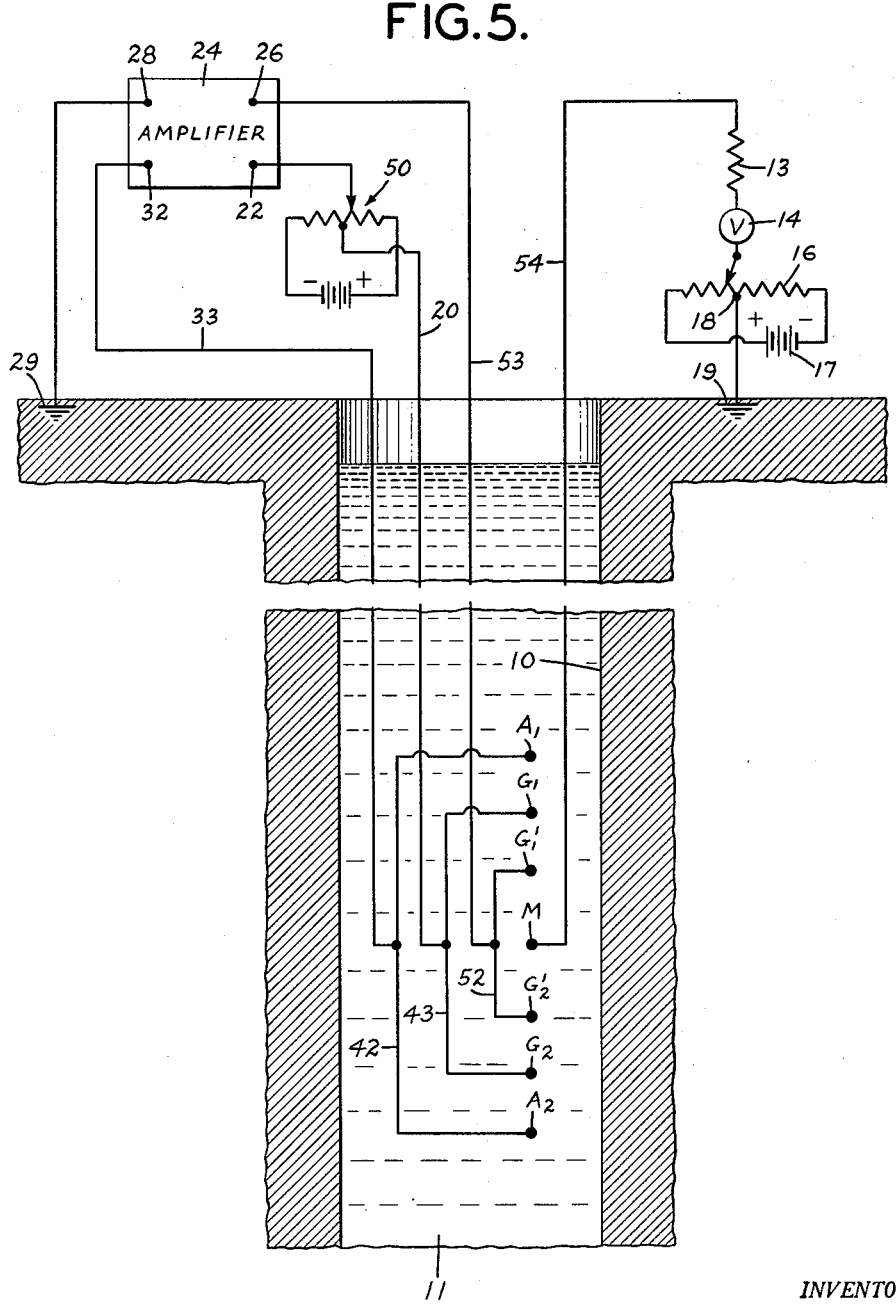

Patented Apr. 8, 1952

2,592,125

UNITED STATES PATENT OFFICE 2,592,125

METHOD AND APPARATUS FOR LOGGING STATIC SPONTANEOUS POTENTIALS IN WELLS

Henri-Georges Doll, Ridgefield, Conn., assignor to Schlumberger Well Surveying Corporation, Houston, Tex., a corporation of Delaware Application November 18, 1949, Serial No. 128,191

16 Claims. (Cl. 175—182)

This application is a continuation-in-part of the applicant's copending application Serial No. 115,467, filed September 13, 1949, for Static Spontaneous Potential Well Logging Method and Apparatus, now abandoned.

The present invention relates to well logging methods and apparatus and more specifically to a novel method and apparatus of this character which are of exceptional utility for determining the locations and thicknesses of permeable and impervious formations traversed by a bore hole in regions where the formations are of high resistivity, although it is not limited to such use.

While conventional spontaneous potential (usually designated "S. P.") logs of the type disclosed in prior Patent No. 1,913,293 to Conrad Schlumberger are widely used with great success for determining the location and vertical extent of permeable formations traversed by a bore hole, their interpretation is sometimes difficult, as in the case of highly resistive formations, for example. This problem is fully discussed in a paper by the applicant entitled "The S. P. Log: Theoretical Analysis and Principles of Interpretation" published by the American Institute of Mining and Metallurgical Engineers in "Petroleum Technology" for September 1948. In the same paper, the applicant introduced the concept of the "static spontaneous potential" (usually called "static S. P.") of permeable formations, a term originated by him which may be defined as the total E. M. F. causing the flow of spontaneous currents in the bore hole.

The "static S. P." is clearly indicative of permeable formations, regardless of the resistivity of the surrounding formations, but it is indicated by a conventional S. P. log only for permeable formations of great thickness. The applicant's copending application Serial No. 60,872, filed November 19, 1948, for "Selective Spontaneous Well Logging Method and Apparatus" discloses how the "static S. P." can be computed from so-called "Selective S. P." logs, but this is a tedious and time consuming task.

The principal object of the invention, accordingly, is to provide a new and improved method and apparatus for determining the locations and thicknesses of the permeable and impervious formations traversed by a bore hole.

Another object of the invention is to provide a novel method and apparatus of the above character which are capable of providing accurate indications of the locations and thicknesses of the permeable and impervious formations traversed by a well regardless of the electrical resistivity of the surrounding formation.

A further object of the present invention is to provide a novel method and apparatus for obtaining "static S. P." logs directly by logging operations in a well instead of deriving them by computation from other logs.

In accordance with the invention, indications are obtained of the potential difference between an electrode and a reference point as the electrode is moved to different positions in the bore hole. At each position, the potential differences between the electrode and each of two points longitudinally spaced apart on opposite sides of the electrode, or between pairs of longitudinally spaced apart points located on opposite sides of the electrode, are adjusted as required to bring the said potential differences substantially to zero. Preferably variations of the potential difference between the electrode and the reference point are continuously recorded in the form of a log indicating the corresponding depths in the bore hole.

In one embodiment, the potential adjustment is effected by controlling the intensity of current emitted at two points near the locations where the potential differences are to be adjusted. If desired, the two current emitting points may coincide with points lying respectively, on opposite sides of the electrode which correspond to terminal potentials for said respective potential differences.

Preferably, the intensity of the current emitted at a current emitting point is automatically controlled in accordance with the magnitude of the potential difference which is to be adjusted, in such fashion as to maintain the said potential difference substantially at zero.

The invention may be better understood from the following detailed description of several typical embodiments thereof, taken in conjunction with the accompanying drawings, in which:

Fig. 2A illustrates schematically a bore hole penetrating a plurality of different earth strata;

Fig. 2B is a graph illustrating a typical log such as might be obtained with the apparatus of Fig. 1 in the well of Fig. 2A;

Fig. 3 is a schematic diagram of a modification which utilizes fewer cable conductors and circuit elements than the system shown in Fig. 1;

Fig. 5 is a schematic diagram of a further modification which employs seven electrodes.

Figure 1:
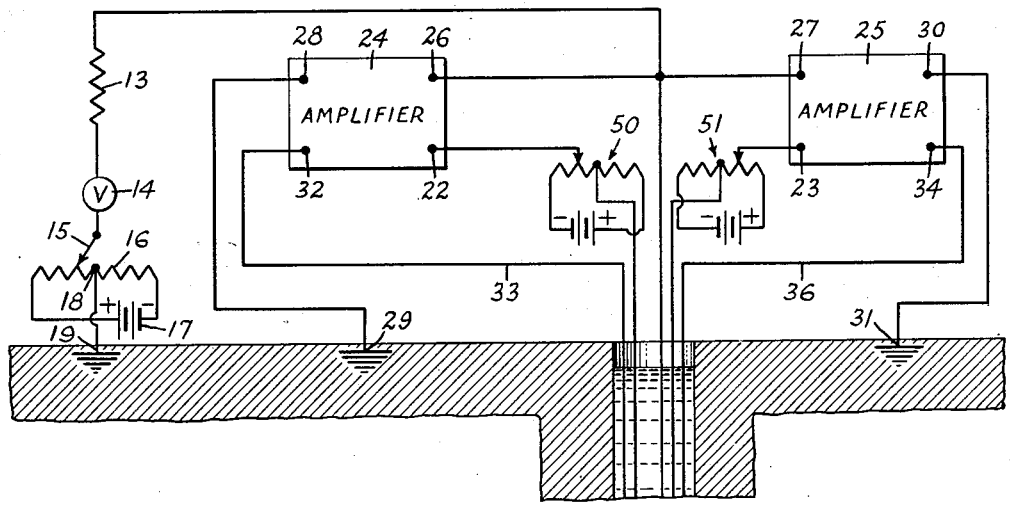
Fig. 1 is a schematic diagram of a typical well logging system constructed according to the invention.

In the illustrative form of the invention shown in Fig. 1, a plurality of electrodes M, G1 and G2, and A1 and A2 are disposed in a bore hole 10 containing a column of conducting liquid 11. Preferably, the electrodes M, G1 and G2 are substantially non-polarizable, stable and have substantially identical contact potentials with the bore hole fluid 11. The term "contact potential" as used herein means the potential occurring between the metal in an electrode and the bore hole fluid as a result of electro-chemical action therebetween.

The electrode M is a potential measuring electrode and it is connected by a conductor 12 to a high impedance potential measuring circuit at the surface of the earth which may include, for example, a high resistance 13 and a potential indicating instrument 14 preferably of the recording type. The potential indicating instrument 14 has one terminal connected to the adjustable contact 15 of a conventional potentiometer 16 energized from a suitable source of electrical energy 17 and having a midtap 18 connected to ground at the point 19. The purpose of the potentiometer 16 is to enable voltage to be introduced into the measuring circuit, if necessary, to compensate for the contact potential of the electrode M.

In accordance with the invention, the potential differences between the electrode M and each of the electrodes G1 and G2 are adjusted as required to maintain the said potential differences substantially at zero. This is accomplished in the embodiment shown in Fig. 1 by emitting currents of suitable intensity into the bore hole liquid 11 from the electrodes A1 and A2. To this end, the electrodes G1 and G2 are connected by the conductors 20 and 21, respectively, to the input terminals 22 and 23, respectively, of the amplifiers 24 and 25, respectively, the other input terminals 26 and 27, respectively, being connected to the conductor 12 which leads to the electrode M. Potentiometers 50 and 51, or other suitable means, may be inserted in series with the conductors 20 and 21 for the purpose of compensating for the contact potentials of the electrodes G1 and G2, if necessary.

It will be understood, therefore, that the input to the amplifier 24 is the potential difference between the electrodes G1 and M, while the input to the amplifier 25 is the potential difference between the electrodes G2 and M.

One output terminal 28 of the amplifier 24 is grounded at the point 29 at the surface of the earth and the corresponding output terminal 30 of the amplifier 25 is grounded at the point 31 at the surface of the earth. The other output terminal 32 of the amplifier 24 is connected by a conductor 33 to the electrode A1. Similarly, the output terminal 34 of the amplifier 25 is connected by a conductor 36 to the electrode A2.

The amplifiers 24 and 25 are preferably designed for substantially 100% degenerative feedback so that the current outputs supplied therefrom to the electrodes A1 and A2, respectively, will be sufficient to maintain the potential differences between each of the electrodes G1 and G2 and the electrode M substantially at zero. Of course, the potential differences between the electrode M and each of the electrodes G1 and G2 can never be exactly zero since there must always be some input to the amplifiers 24 and 25 if they are to function in the manner described. However, if very high gain amplifiers are employed, the inputs to the amplifiers 24 and 25 need only be very small for proper operation so that the potential differences between the electrodes can be brought substantially to zero.

In operation, let it be assumed that the electrode system of Fig. 1 is disposed at about the midpoint of a permeable formation 37 (Fig. 2A) sandwiched between two impervious formations 38 and 39, the formation 37 being of lower resistivity than the formations 38 and 39. If, initially, the amplifiers 24 and 25 are not in operation, the log obtained as the electrode system is moved through the bore hole will be essentially the conventional S. P. log for the formation 37 which is shown at 40 on the graph of Fig. 2B. The log obtained with the amplifiers 24 and 25 in operation, after steady state conditions have been reached, is essentially the "static S. P." log 41, which is shown in Fig. 2B.

The differences between the conventional "S. P." log 40 and the "static S. P." log 41 can be explained by assuming the electrode assembly to be disposed at the midpoint of the formation 37, as shown in Fig. 2A, and considering the conditions that obtain before and after the amplifiers 24 and 25 are energized. With the amplifiers 24 and 25 deenergized, the potentials at the electrodes G1, M and G2 are given by the amplitudes of the "S. P." curve 40 at the points $a$, $b$ and $c$, respectively. It will be apparent, therefore, that potential differences $b$, $d$ exist between the electrode M and each of the electrodes G1 and G2.

After the amplifiers 24 and 25 have been turned on and begin operating, the currents emitted from the electrodes A1 and A2 make the potentials of the electrodes G1, G2 and M more negative, but the negative increase of the potentials of the electrodes G1 and G2 is greater than the negative increase of the potential of the electrode M since the former are in closer proximity to electrodes A1 and A2, respectively. This action, therefore, increases negatively the potentials of all three electrodes G1, M, and G2 with respect to ground, and decreases the potential differences between electrodes G1–M and G2–M, which control the current outputs of amplifiers 24 and 25, respectively.

The potentials of the electrodes G1, M and G2 at one instant after the amplifiers have begun to operate are shown on Fig. 2B as $a'$, $b'$ and $c'$ respectively. At this instant, there is still a potential difference $b'-d'$ between each of the exterior electrodes and the electrode M, though this difference is now less than $b-d$. The action of the amplifiers continues until there is substantially no potential difference between the electrodes, that is when the electrodes are at the same potentials $a''$, $b''$, and $c''$. Since the electrodes G1, M and G2 are at the same potential, there can be no longer any S. P. current flowing in the bore hole in the interval between electrodes G1 and G2. Therefore, the electrode M must be at the static spontaneous potential, which is measured by the meter 14.

It will be understood that the sequence of events described above occurs almost instantoneously. Hence, the log obtained with the indicating instrument 14 of the apparatus shown in Fig. 1, will be essentially the "static S. P." log.

If desired, the apparatus can be simplified somewhat by connecting the electrodes A1 and A2 together by an insulated conductor 42, the midpoint of which is connected to the conductor 33, the electrodes G1 and G2 also being connected together by an insulated conductor 43 which is connected to the conductor 20, as shown in Fig. 3. As shown, this eliminates the conductors 21 and 36 as well as the amplifier 25. This embodiment operates in essentially the same manner as the form of the invention shown in Fig. 1 above.

Figure 4:
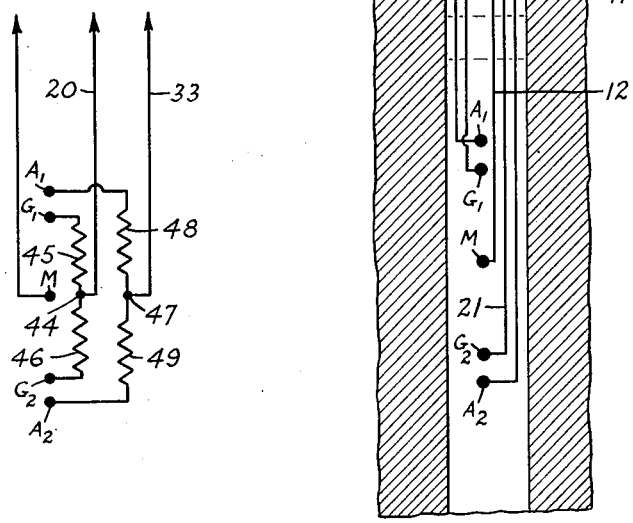
Fig. 4 illustrates an alternative electrode construction which may be used with the modified system shown in Fig. 3.

In the system shown in Fig. 3, the potential at the input electrode 22 of the amplifier 24 should preferably be the average of the potentials at the electrodes G1 and G2. In order to insure that an average value will be obtained, an electrode system of the type shown in Fig. 4 should preferably be employed. In this figure, the conductor 20 is connected to the junction point 44 between two substantially identical resistors 45 and 46 which are connected in series to the electrodes G1 and G2. In similar fashion, the conductor 33 may be connected to the junction point 47 between two substantially identical resistors 48 and 49 connected in series between the electrodes A1 and A2, if desired.

While in the several embodiments shown in Figs. 1 and 3, the potentials of the electrodes G1 and G2 are controlled by the current emitted from the auxiliary electrodes A1 and A2, respectively, this is not necessary. If desired, the control current might be supplied directly to the electrodes G1 and G2, provided that these electrodes are large and extremely nonpolarizable. This would result in the elimination of additional conductors and electrodes.

The modification shown in Fig. 5 is like that illustrated in Fig. 3 except that an additional pair of potential electrodes G'1 and G'2, connected together by an insulated conductor 52 is interposed between the pair of electrodes G1, G2 and the electrode M. The pair of electrodes G1, G2 is connected by the conductor 20 to the input terminal 22 of the amplifier 24 as before, while the pair of electrodes G'1, G'2 is connected by the conductor 53 to the other amplifier terminal 26. Thus, the input to the amplifier 24 is the potential difference between the pairs of electrodes G1, G2 and G'1, G'2. The potential measuring electrode M is connected by a conductor 54 to the potential measuring circuit at the surface of the earth.

In operation, the amplifier 24 automatically supplies current to the electrodes A1 and A2 so as to reduce the potential differences between the electrodes G1 and G'1 and G2 and G'2 substantially to zero. The potential difference between the electrode M and the remote ground 19, therefore, is essentially the "static S. P."

From the foregoing, it will be understood that the invention provides a novel and highly effective method and apparatus for obtaining directly the "static S. P." log of earth formations traversed by a bore hole. As indicated, the method and apparatus are of special utility in regions where the formations are of high resistivity and where difficulties are encountered in the interpretation of conventional "S. P." logs.

It will be understood that the several embodiments described above, by way of example, are susceptible of considerable modification within the spirit of the invention. For example, the amplifiers and associated circuits need not be located at the surface of the earth but may be lowered into the bore hole with the electrode assembly, thus reducing the number of insulated conductors in the supporting cable. Also, other suitable high impedance measuring devices, such as vacuum tube voltmeters, for example, may be employed in the circuit of the measuring electrode M instead of the simple high impedance meter shown in the figures. Other modifications will suggest themselves to persons skilled in the art. The illustrative embodiments described above, therefore, are not to be regarded as limiting in any way the scope of the following claims.

I claim:

1. In a method of investigating earth formations traversed by a bore hole containing a relatively conducting liquid, the steps of emitting current in the bore hole in a direction counter to the flow of naturally occurring currents in a portion of the bore hole, and obtaining indications of the potential difference between a point in said bore hole portion and a reference point other than said point in the bore hole.

2. In a method of investigating earth formations traversed by a bore hole containing a relatively conducting liquid, the steps of disposing an electrode in the bore hole, emitting current in the bore hole at nearby locations above and below said electrode to counterbalance the flow of naturally occurring currents in the vicinity of said electrode, and obtaining indications of the potential difference between said electrode and a reference point other than said point in the bore hole.

3. In a method for investigating earth formations traversed by a bore hole containing a column of relatively conducting liquid, the steps of substantially counterbalancing the flow of naturally occurring currents in a first portion of said bore hole, counterbalancing the flow of naturally occurring currents in a second portion of the bore hole, and obtaining indications of the potential difference between a point intermediate of said portions and a reference point other than said point in the bore hole.

4. In a method for investigating earth formations traversed by a bore hole containing a column of relatively conducting liquid, the steps of disposing at least three longitudinally spaced apart electrodes in the bore hole, adjusting the potential difference between two of said electrodes that are adjacent one another to bring said potential difference substantially to zero, and obtaining indications of the potential difference between the third of said electrodes and a reference point.

5. In a method for investigating earth formations traversed by a bore hole containing a column of conducting liquid, the steps of emitting current at a given level in the bore hole to reduce the potential difference caused by the flow of naturally occurring currents between two longitudinally spaced apart points substantially to zero, simultaneously emitting current at another level in the bore hole to reduce the potential difference caused by the flow of naturally occurring currents between two other longitudinally spaced apart points substantially to zero, and obtaining indications of the potential difference between a point intermediate of said current emitting levels, and a reference point.

6. In a method for investigating earth formations traversed by a bore hole, the steps of disposing an electrode in the bore hole, maintaining the potential difference produced by the flow of naturally occurring currents between said electrode and a point in the bore hole longitudinally spaced apart therefrom substantially at zero, and obtaining indications of potential difference between said electrode and a reference point.

7. In a method for investigating earth formations traversed by a bore hole, the steps of disposing an electrode in the bore hole, adjusting the potential at a point in the bore hole near said electrode but longitudinally spaced apart therefrom to bring the potential difference produced by the flow of naturally occurring currents between said electrode and said point substantially to zero, and obtaining indications of potential difference between said electrode and a reference point.

8. In a method for investigating earth formations traversed by a bore hole, the steps of disposing an electrode in the bore hole, emitting current in the bore hole to adjust the potential at a point in the bore hole near said electrode but longitudinally spaced apart therefrom to bring the potential difference produced by the flow of naturally occurring currents between said electrode and said point substantially to zero, and obtaining indications of potential difference between said electrode and a reference point.

9. In a method for investigating earth formations traversed by a bore hole, the steps of disposing at least three longitudinally spaced apart electrodes in the bore hole, adjusting the potentials of the two end electrodes to bring the potential differences produced by the flow of naturally occurring currents between each of them and the intermediate electrode substantially to zero, and obtaining indications of potential difference between said intermediate electrode and a reference point.

10. In a method for investigating earth formations traversed by a bore hole, the steps of disposing at least three longitudinally spaced apart electrodes in the bore hole, emitting current at points near the two end electrodes to adjust the potentials of said end electrodes to bring the potential differences produced by the flow of naturally occurring currents between each of them and the intermediate electrode substantially to zero, and obtaining indications of potential difference between said intermediate electrode and a reference point.

11. In a method for investigating earth formations traversed by a bore hole, the steps of disposing at least three longitudinally spaced apart electrodes in the bore hole, emitting current at points near the two end electrodes to adjust the potentials of said end electrodes to bring the potential differences produced by the flow of naturally occurring currents between each of them and the intermediate electrode substantially to zero, controlling the intensity of the current emitted at each of said points in accordance with the potential difference produced by the flow of naturally occurring currents between said intermediate electrode and the corresponding end electrode, respectively, and continuously recording the potential difference between said intermediate electrode and a reference point as a function of depth in the bore hole.

12. In well logging apparatus, the combination of at least two longitudinally spaced apart electrodes adapted to be lowered into a well, means for maintaining the potential difference between one of said electrodes and a point located between said electrodes substantially zero, means for maintaining the potential difference between the other of said electrodes and a point located between said electrodes substantially zero, and means for exhibiting a function of potential difference between a point intermediate of said electrodes and a reference point.

13. In well logging apparatus, the combination of an electrode adapted to be lowered into a bore hole, a first pair of electrodes disposed longitudinally on opposite sides of said electrode and movable therewith, a second pair of electrodes disposed longitudinally on opposite sides of said electrode outside of said first pair of electrodes and movable therewith, means responsive to the potential differences produced by the flow of naturally occurring currents between said electrode and each electrode of said first pair for supplying current to said second pair of electrodes to reduce said potential differences substantially to zero, and means for recording potential difference between said electrode and a reference point.

14. In well logging apparatus, the combination of an electrode adapted to be lowered into a bore hole, a first pair of electrodes disposed longitudinally on opposite sides of said electrode and movable therewith, a second pair of electrodes disposed longitudinally on opposite sides of said electrode outside of said first pair of electrodes, an electrical connection between the electrodes of said first pair, an electrical connection between the electrodes of said second pair, means responsive to the potential difference produced by the flow of naturally occurring currents between said electrode and said first pair of electrodes for supplying current to said second pair of electrodes to reduce said potential difference substantially to zero, and means for recording potential difference between said electrode and a reference point.

15. In well logging apparatus, the combination of an electrode adapted to be lowered into a bore, of a first pair of electrodes disposed longitudinally of the bore hole on opposite sides of said electrode and movable therewith, a second pair of electrodes disposed longitudinally of the bore hole on opposite sides of said electrode and outside of said first pair of electrodes, a first pair of series connected resistors interposed between the electrodes of said first pair, a second pair of series connected resistors interposed between the electrodes of said second pair, amplifier means having a grounded input terminal and another input terminal connected to the junction of said first pair of resistors and having a grounded output terminal and another output terminal connected to the junction of said second pair of resistors, and means for recording potential difference between said electrode and a reference point.

16. In well logging apparatus, the combination of an electrode adapted to be lowered into a bore hole, a first pair of electrodes disposed longitudinally on opposite sides of said electrode in fixed relation thereto and connected together by an insulated conductor, a second pair of electrodes disposed longitudinally on opposite sides of said electrode outside of said first pair of electrodes and connected together by an insulated conductor, a third pair of electrodes disposed longitudinally on opposite sides of said electrode outside of said second pair of electrodes and connected together by an insulated conductor, means responsive to the potential difference produced by the flow of naturally occurring currents between said first and second pairs of electrodes for supplying current to said third pair of electrodes to reduce said potential difference substantially to zero, and means for recording potential difference between said electrode and a reference point.

HENRI-GEORGES DOLL.

REFERENCES CITED

The following references are of record in the file of this patent:

UNITED STATES PATENTS

| Number | Name | Date |
| --- | --- | --- |
| 1,966,105 | Ostermeier | July 10, 1934 |
| 2,459,196 | Stewart | Jan. 18, 1949 |